(12) United States Patent
Li et al.

(10) Patent No.: US 10,444,616 B2
(45) Date of Patent: Oct. 15, 2019

(54) REAR PROJECTION SCREEN

(71) Applicant: NANO PRECISION TAIWAN LIMITED, Hsinchu County (TW)

(72) Inventors: Ching-Hsiang Li, Hsin-Chu (TW);
Fang-Hsuan Su, Hsin-Chu (TW);
Shu-Ping Yang, Hsin-Chu (TW);
Chi-Tang Hsieh, Hsin-Chu (TW);
Fu-Chiang Hsu, Hsin-Chu (TW);
Hung-Ta Chien, Hsin-Chu (TW)

(73) Assignee: NANO PRECISION TAIWAN LIMITED, Hsinchu County (TW)

( * ) Notice: Subject to any disclaimer, the term of this patent is extended or adjusted under 35 U.S.C. 154(b) by 0 days.

(21) Appl. No.: 15/925,668

(22) Filed: Mar. 19, 2018

(65) Prior Publication Data

US 2018/0284593 A1 Oct. 4, 2018

(30) Foreign Application Priority Data

Mar. 29, 2017 (CN) .......................... 2017 1 0197457

(51) Int. Cl.
*G03B 21/62* (2014.01)
*G02B 5/00* (2006.01)
*G02B 5/02* (2006.01)
*G02B 27/09* (2006.01)

(52) U.S. Cl.
CPC ............. *G03B 21/62* (2013.01); *G02B 5/003* (2013.01); *G02B 5/0231* (2013.01); *G02B 27/0972* (2013.01)

(58) Field of Classification Search
CPC .................................................. G03B 21/62

USPC .......................................................... 359/460
See application file for complete search history.

(56) References Cited

U.S. PATENT DOCUMENTS

| | | | | |
|---|---|---|---|---|
| 6,417,966 B1* | 7/2002 | Moshrefzadeh | ....... | G03B 21/62 359/453 |
| 6,822,792 B2* | 11/2004 | Goto | .................... | G03B 21/625 359/456 |
| 8,553,325 B2* | 10/2013 | Endo | .................... | G02B 5/0231 359/449 |

(Continued)

FOREIGN PATENT DOCUMENTS

| CN | 1873527 A | 12/2006 |
|---|---|---|
| CN | 100541323 C | 9/2009 |

(Continued)

*Primary Examiner* — Christopher E Mahoney (57) ABSTRACT

A rear projection screen includes a transparent substrate, a light absorbing film and a first diffusion film in sequence from a projection side to a viewer side. The transparent substrate includes a first surface and a second surface opposite to each other, the first surface faces the projection side, the second surface faces the viewer side, and the first surface is disposed with a plurality of prism structures protruding toward the projection side. The transparent substrate is located between the light absorbing film and the prism structures. The light absorbing film includes a plurality of light absorbing structures arranged at intervals from each other, and the distribution density of the prism structures is greater than that of the light absorbing structures. The light absorbing film is located between the first diffusion film and the transparent substrate. The rear projection screen through the above-mentioned design has a good image display quality.

24 Claims, 10 Drawing Sheets

(56) References Cited

U.S. PATENT DOCUMENTS

| | | | | |
|---|---|---|---|---|
| 2004/0196562 | A1* | 10/2004 | Watanabe | G02B 3/08 |
| | | | | 359/626 |
| 2005/0200953 | A1* | 9/2005 | Sekiguchi | G03B 21/625 |
| | | | | 359/460 |
| 2006/0139749 | A1* | 6/2006 | Watanabe | G02B 17/006 |
| | | | | 359/460 |
| 2009/0190211 | A1* | 7/2009 | Kodama | G02B 5/0242 |
| | | | | 359/457 |
| 2011/0122493 | A1* | 5/2011 | Ogawa | G03B 21/62 |
| | | | | 359/457 |
| 2011/0216416 | A1* | 9/2011 | Kashiwagi | B32B 27/36 |
| | | | | 359/609 |
| 2012/0319999 | A1* | 12/2012 | Kamiya | G02B 5/0231 |
| | | | | 345/175 |
| 2018/0275480 | A1* | 9/2018 | Kubota | G02B 5/02 |

FOREIGN PATENT DOCUMENTS

| | | |
|---|---|---|
| CN | 103748514 A | 4/2014 |
| CN | 203587956 U | 5/2014 |
| TW | I385468 B | 2/2013 |

* cited by examiner

REAR PROJECTION SCREEN

CROSS-REFERENCE TO RELATED APPLICATION

THIS APPLICATION CLAIMS THE PRIORITY BENEFIT OF CHINA APPLICATION (CN201710197457.X FILED ON 2017 Mar. 29). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a rear projection screen, and more particularly to a rear projection screen adapted for large size display.

BACKGROUND OF THE INVENTION

Due to the rapid development of optical technology, many display devices have been developed and applied to daily life. Among them, the rear projection display device has the advantage of large size display and high contrast, so it is regarded as an important development trend in the display. In general, the rear projection display device is that the viewer and the projector are located on both sides of the screen respectively, and the viewer views the image by the projection beam of the projector transmitted from the screen.

The architecture of the rear projection display device includes a projector and a projection screen. The projection screen includes a plurality of prism structures facing the viewer and a diffusion layer facing the projector, and each prism structure is provided with adjacent refractive portion and anti-light portion. The projection beam emitted by the projector is refracted and guided by the refractive portion of the prism structure, so that the viewer can see the normal image on the projection screen. The anti-light portion of the prism structure will absorb the majority of the external ambient light, so the external ambient light will not incident to the eyes of the viewer and cause the contrast of the image to decline, effectively prevent the external ambient light affect the image quality. In addition, the diffusion layer of the projection screen can homogenize the projection beam incident on the projection screen to help improve the quality of the image.

However, the architecture of the above-mentioned rear projection display device has the following drawbacks:

(1) Since the refractive portion and the anti-light portion are integrated on the same prism structure, so it can only be applied to the architecture of the hanging type projector.

(2) Since the refractive portion and the anti-light portion are integrated on the same prism structure, when the projection beam passes through the prism structure, a portion of the projected beam will be absorbed by the light absorbing material of the anti-light portion, resulting in the decrease in light utilization efficiency.

(3) When the above-mentioned structure of projection screen is used with the ultra short focus projector, the gain of luminance will be too low, and the uniformity of the image will be poor.

(4) Because the diffusion layer of the projection screen is facing the projector, the improvement of the image quality is limited, and there will be doubts of generating hotspots.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

An objective of the invention is to provide a rear projection screen having good image display quality.

Other objectives and advantages of the invention may be further illustrated by the technical features disclosed in the invention.

In order to achieve one or a portion of or all of the objectives or other objectives, an embodiment of the invention provides a rear projection screen, which includes a transparent substrate, a light absorbing film, and a first diffusion film in sequence from a projection side to a viewer side. The transparent substrate includes a first surface and a second surface opposite to the first surface, the first surface faces the projection side, the second surface faces the viewer side, and the first surface is disposed with a plurality of prism structures protruding toward the projection side. The transparent substrate is located between the light absorbing film and the prism structures, the light absorbing film includes a plurality of light absorbing structures arranged at intervals from each other, and a distribution density of the prism structures is greater than a distribution density of the light absorbing structures. The light absorbing film is located between the first diffusion film and the transparent substrate.

In order to achieve one or a portion of or all of the objectives or other objectives, another embodiment of the invention provides a rear projection screen, which includes a transparent substrate, a diffusion film, and a light absorbing film in sequence from a projection side to a viewer side. The transparent substrate includes a first surface and a second surface opposite to the first surface, the first surface faces the projection side, the second surface faces the viewer side, and the first surface is disposed with a plurality of prism structures protruding toward the projection side. The transparent substrate is located between the light absorbing film and the prism structures, the light absorbing film includes a plurality of light absorbing structures arranged at intervals from each other, and a distribution density of the prism structures is greater than a distribution density of the light absorbing structures. The diffusion film is located between the light absorbing film and the transparent substrate.

The rear projection screen of the embodiment of the invention has the following advantages:

(1) In the embodiment of the invention, the prism structure having the refractive function and the light absorbing structure having the light absorbing function are independent optical components, and therefore, the rear projection screen of the embodiment of the invention can be applied to both hanging type projector and general downward projection architecture.

(2) The prism structure of the embodiment of the invention is facing the projection side, and the guide of the optical path of the projection beam is completely refracted by the prism structure. Therefore, the rear projection screen of the embodiment of the invention can be applied to the super short focus projector and have high gain of luminance.

(3) The diffusion layer of the embodiment of the invention is facing the viewer side, which contributes to improving the image quality and does not generate hotspots.

(4) By adjusting the distribution density of the light absorbing structures of the embodiments of the invention, it is helpful to improve the image quality.

Other objectives, features and advantages of The invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described.

The components of the invention can be positioned in a number of different orientations. As such, the directional terminology is used for purposes of illustration and is in no way limiting. On the other hand, the drawings are only schematic, and the sizes of components may be exaggerated for clarity. It is to be understood that other embodiments may be utilized, and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
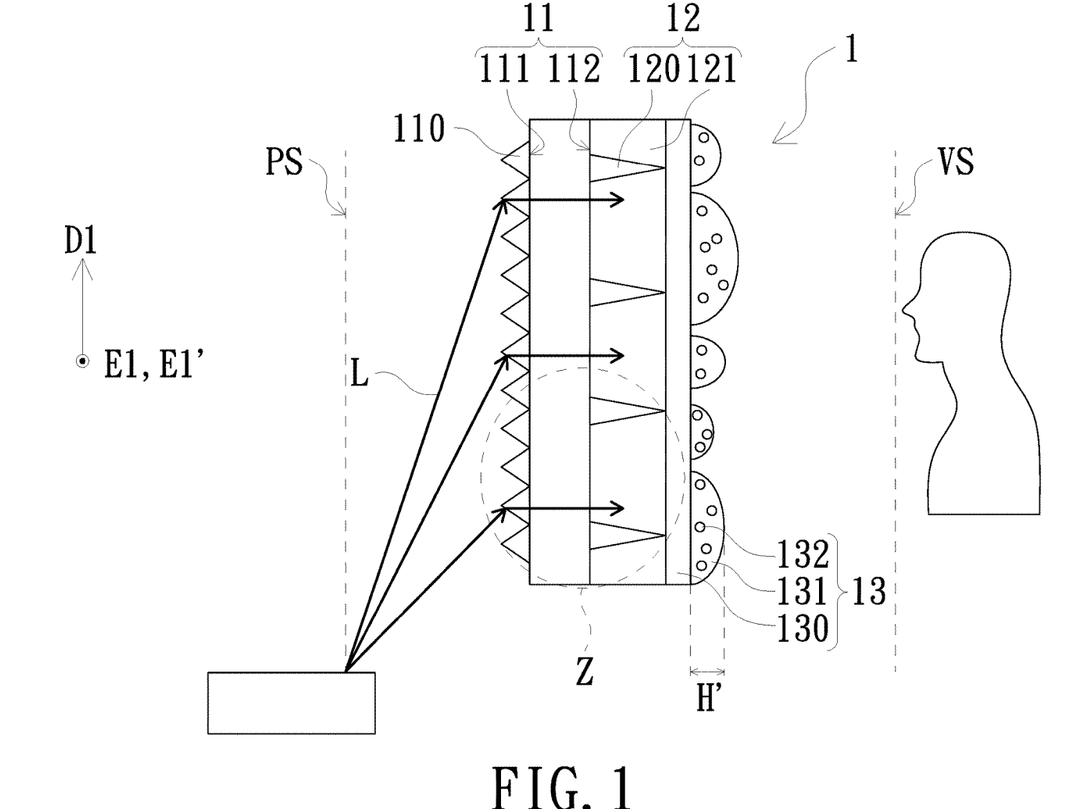
FIG. 1 is a schematic cross-sectional view of a rear projection screen according to an embodiment of the invention.

Referring to FIG. 1, which is a schematic cross-sectional view of a rear projection screen according to an embodiment of the invention. As shown in FIG. 1, the rear projection screen 1 of the embodiment is located between the projection side PS and the viewer side VS, and the projection side PS and the viewer side VS are located on the two opposite sides of the rear projection screen 1, respectively. The rear projection screen 1 of the embodiment includes a transparent substrate 11, a light absorbing film 12, and a first diffusion film 13 in sequence from the projection side PS to the viewer side VS. The transparent substrate 11 includes a first surface 111 and a second surface 112 opposite to the first surface 111, the first surface 111 of the transparent substrate 11 faces the projection side PS, the second surface 112 of the transparent substrate 11 faces the viewer side VS, and the first surface 111 is disposed with a plurality of prism structures 110 protruding toward the projection side PS for refracting the projection beam L from the projection side PS. The transparent substrate 11 is located between the light absorbing film 12 and the prism structures 110. The light absorbing film 12 includes a plurality of light absorbing structures 120 arranged at intervals from each other to absorb the external ambient light (not shown in the figures) from the viewer side VS, and the distribution density of the prism structures 110 is greater than the distribution density of the light absorbing structures 120. The light absorbing film 12 is located between the first diffusion film 13 and the transparent substrate 11.

The detailed structure of the rear projection screen 1 of the embodiment will be described in the following descriptions.

Figure 2:
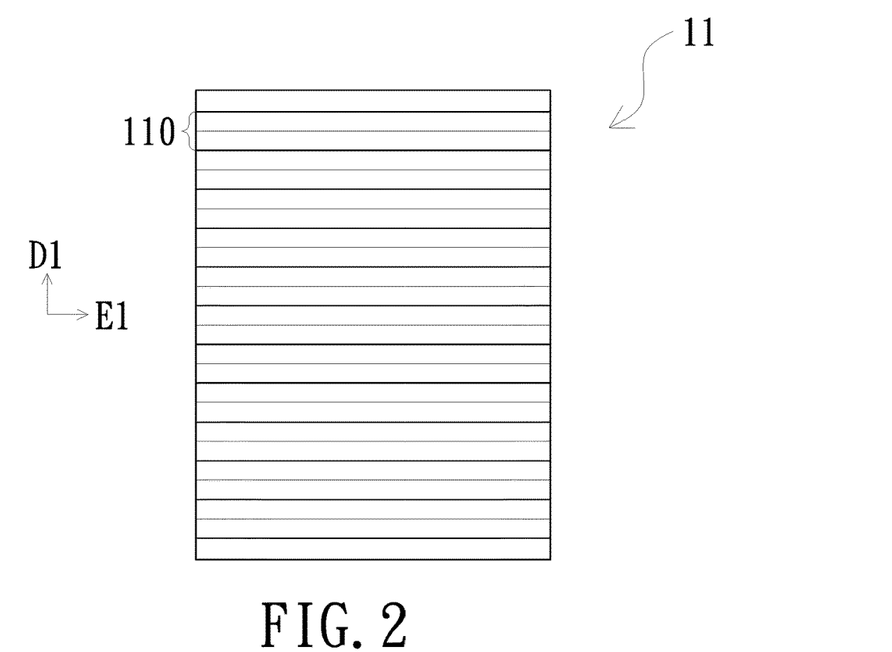
FIG. 2 is a schematic front view of the transparent substrate shown in FIG. 1 viewed from the projection side.
Figure 3:
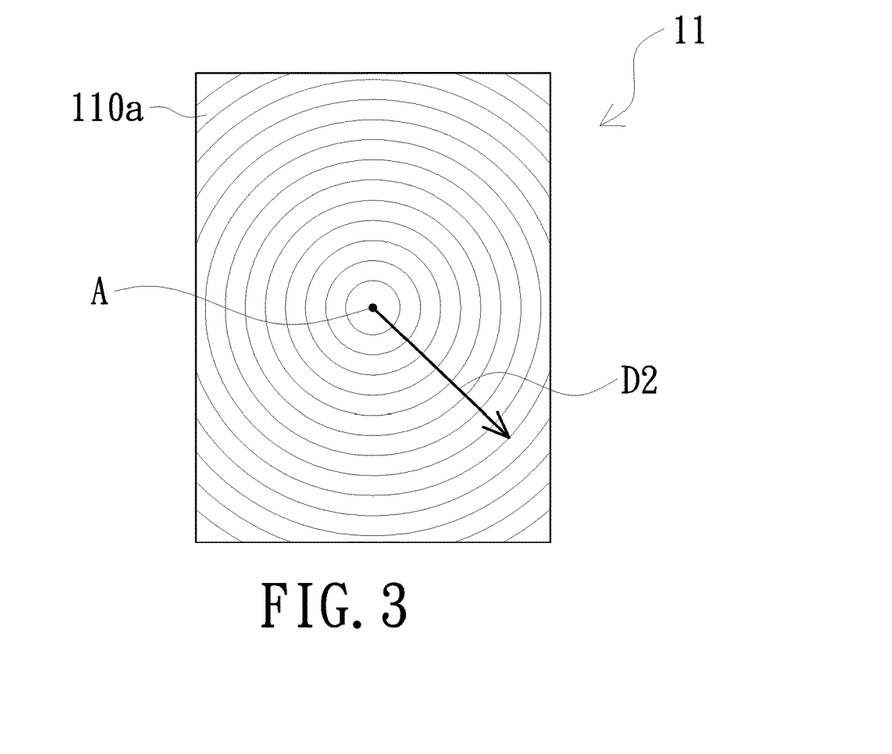
FIG. 3 is a schematic view showing the distribution pattern of the prism structures shown in FIG. 1 viewed from the projection side according to another embodiment of the invention.

Referring to FIG. 2, which is a schematic front view of the transparent substrate 11 shown in FIG. 1 viewed from the projection side. As shown in FIG. 1 and FIG. 2, the prism structures 110 of the embodiment are arranged in a distribution direction D1 respectively, and each of the prism structures 110 is, for example, a columnar structure extending in an extending direction E1. In the embodiment, the distribution direction D1 of the prism structures 110 and the extending direction E1 of each prism structure 110 are, for example, not parallel to each other. Specifically, the distribution direction D1 of the prism structures 110 is in the vertical direction, and the extending direction E1 of each prism structure 110 is in the horizontal direction. It is to be noted that the prism structures 110 being arranged in the distribution direction D1 is only one of the embodiments of the invention, to which the invention is not limited. In other embodiments as shown in FIG. 3, the prism structures 110a are in a concentric annular distribution from the axis A of the transparent substrate 11 along a radial direction D2.

Figure 4:
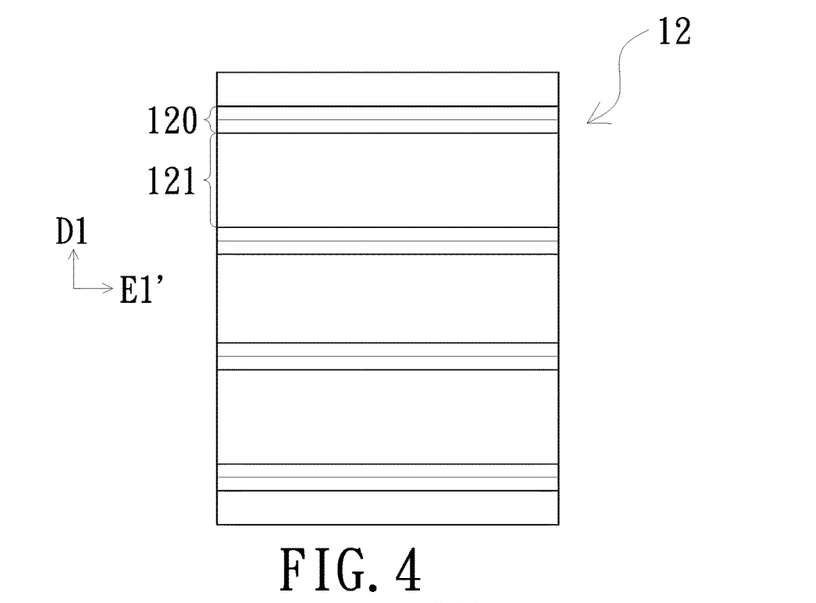
FIG. 4 is a front view of the light absorbing film shown in FIG. 1 as being viewed from the viewer side.

Referring to FIG. 4, which is a front view of the light absorbing film 12 shown in FIG. 1 as being viewed from the viewer side. As shown in FIG. 1 and FIG. 4, the light absorbing film 12 of the embodiment further includes a plurality of light-transmitting portions 121. The light-transmitting portions 121 and the light absorbing structures 120 of the light absorbing film 12 are staggered with each other in the distribution direction D1 respectively, and each light absorbing structure 120 is, for example, a columnar structure extending in the extending direction E1'. The projection beam L from the projection side PS smoothly passes through the light absorbing film 12 through the light-transmitting portions 121 without being blocked by the light absorbing structures 120, and the external ambient light (not shown in the figures) from the viewer side VS is absorbed by the light absorbing structures 120 without being reflected to the viewer. In the embodiment, the distribution direction D1 of the light absorbing structures 120 and the extending direction E1' of each light absorbing structure 120 are, for example, not parallel to each other. Specifically, the distribution direction D1 of the light absorbing structures 120 is in the vertical direction, and the extending direction E1' of each light absorbing structure 120 is in the horizontal direction, that is, the distribution direction D1 of the prism structures 110 of the embodiment is the same as the distribution direction D1 of the light absorbing structures 120 in the vertical direction, and the extending direction E1 of each prism structure 110 is the same as the extending direction E1' of each light absorbing structure 120 in the horizontal direction. In the embodiment, the light absorbing structures 120 may include the dark light absorbing material, and the light absorbing material may be the black ink, the black paint, the black colloid, the black powder or other dark material.

Figure 5:
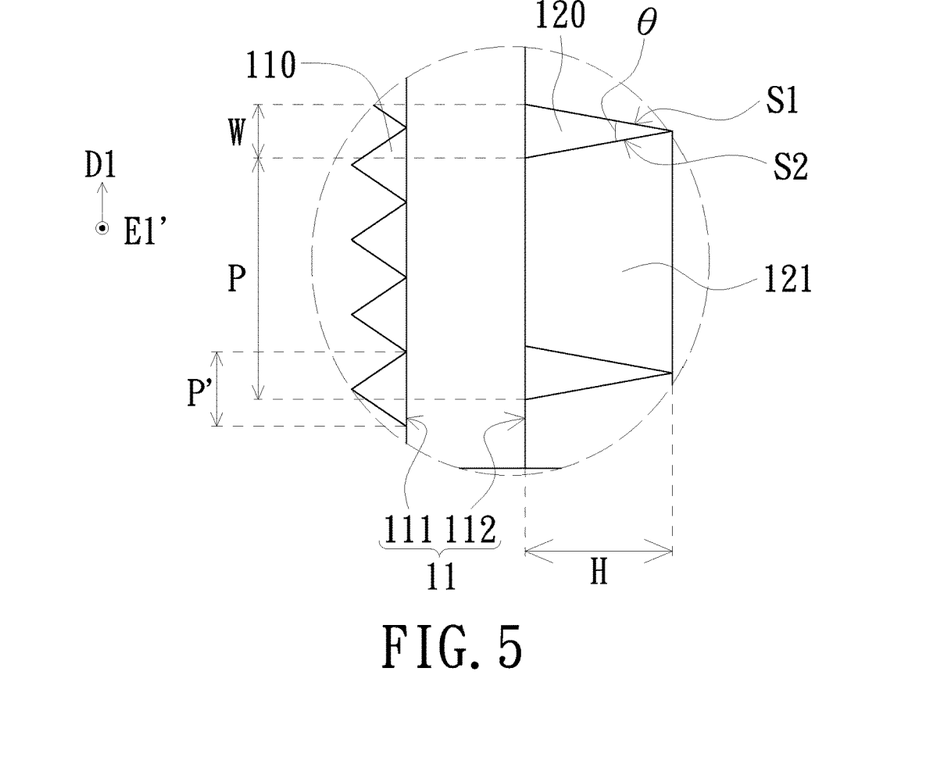
FIG. 5 is an enlarged schematic view of the area Z shown in FIG. 1.

Referring to FIG. 5, which is an enlarged schematic view of the area Z shown in FIG. 1, that is, the partially enlarged schematic view of the transparent substrate 11 and the light absorbing film 12. As shown in FIG. 1 and FIG. 5, each light absorbing structure 120 of the embodiment is, for example, a columnar structure tapered from the projection side PS toward the viewer side VS, and the maximum width W of each light absorbing structure 120 in the distribution direction D1 is, for example, greater than 10 microns (μm), to which the invention is not limited. Further, each light absorbing structure 120 includes a first slope S1 and a second slope S2 extending in the extending direction E1', the first slope S1 and the second slope S2 are inclined to each other in the direction close to each other and connected to each other, and the angle θ between the first slope S1 and the second slope S2 is, for example, less than 28 degrees, to which the invention is not limited. Under such a structural design, it can effectively improve the absorption efficiency of each light absorbing structure 120 for the external ambient light from the viewer side VS. It is to be noted that the light absorbing structures 120 of the light absorbing film 12 have an arrangement period P in the distribution direction D1, that is, an appropriate pitch is formed between each adjacent two light absorbing structures 120. Each light absorbing structure 120 has a thickness H, that is, the distance that each light absorbing structure 120 extends in the direction from the projection side PS toward the viewer side VS. In the embodiment, the arrangement period P of the light absorbing structures 120 and the thickness H of each light absorbing structure 120 satisfy the relationship of H/P<2. In addition, the prism structures 110 of the transparent substrate 11 have the arrangement period P' in the distribution direction D1, where P≥P'/2.

As shown in FIG. 1, the first diffusion film 13 of the embodiment includes a substrate 130 and a plurality of microstructures 131 disposed on the substrate 130, and each of the microstructures 131 includes a plurality of diffusion particles 132. When the projection beam L of the projection side PS enters the rear projection screen 1, the projection beam L sequentially passes through the prism structures 110, the transparent substrate 11, the light absorbing film 12, and the first diffusion film 13. The projection beam L is guided to the forward direction, which is substantially perpendicular to the distribution direction D1 (horizontal direction) of the prism structure 110, through the total reflection of the prism structures 110. The projection beam L guided to the forward direction passes through the light-transmitting portions 121 of the light absorbing film 12 to reach the first diffusion film 13, and the projection beam L will be uniformly emitted from the rear projection screen 1 through the microstructures 131 of the first diffusion film 13 and the diffusion particles 132 located in the microstructures 131 to achieve the effect of increasing the viewing angle, thereby improving the quality of the image. It is worth mentioning that the first diffusion film 13 of the embodiment is located at the outermost layer of the rear projection screen 1 (i.e., the position closest to the viewer side VS), so that when the projection beam L of the projection side PS enters the rear projection screen 1, the projection beam L is directly refracted by the prism structures 110 without passing through the first diffusion film 13 first. In such circumstances, the projection beam L can be maintained in good collimation after being refracted by the prism structures 110, so as to reduce the absorption of the projection beam L by the light absorbing structures 120 of the light absorbing film 12 and the consequent low efficiency.

Figure 6:
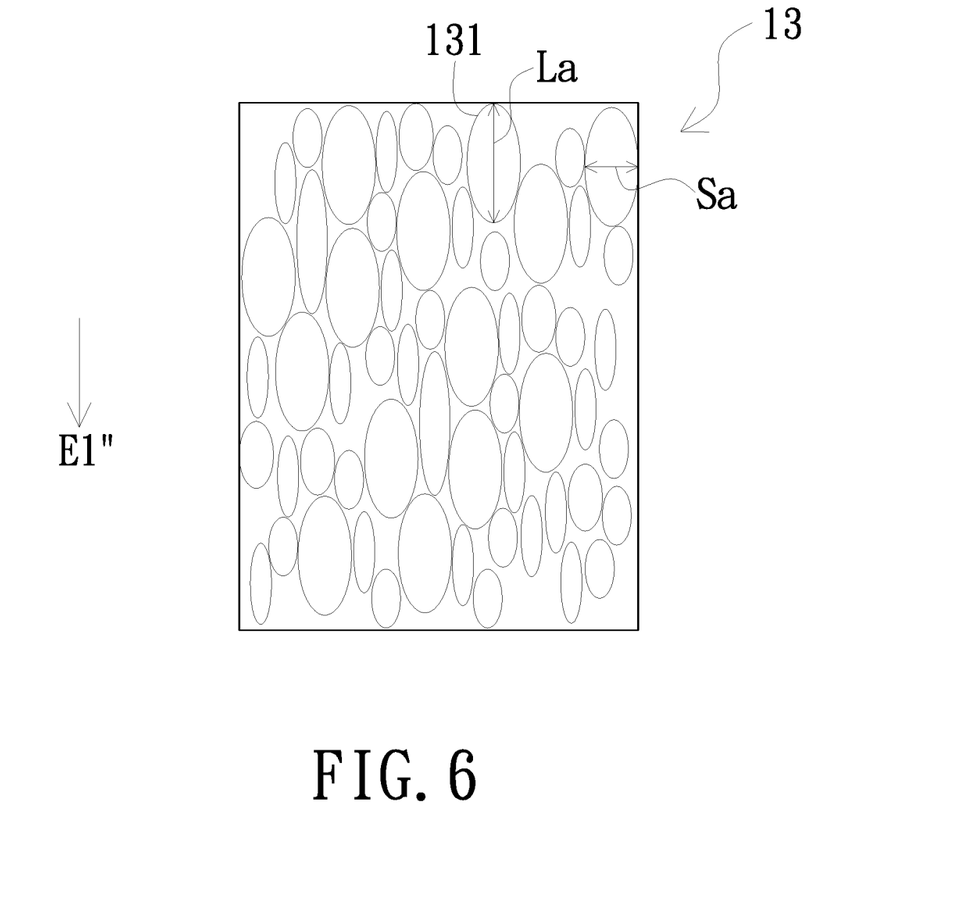
FIG. 6 is a front view of the first diffusion film shown in FIG. 1 as being viewed from the viewer side.
Figure 7:
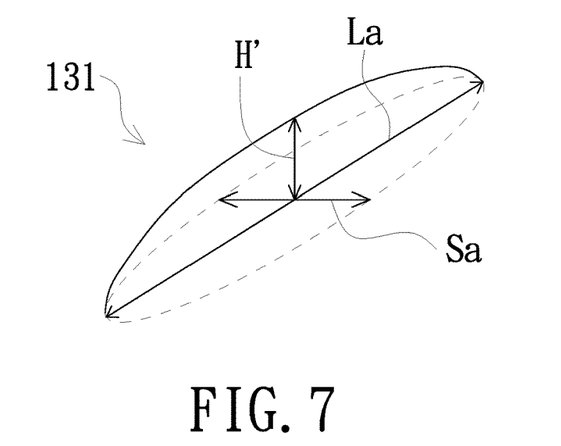
FIG. 7 is a schematic view showing the appearance structure of each microstructure shown in FIG. 1.

Referring to FIG. 6 and FIG. 7. FIG. 6 is a front view of the first diffusion film 13 shown in FIG. 1 as being viewed from the viewer side. FIG. 7 is a schematic view showing the appearance structure of each microstructure 131 shown in FIG. 1. As shown in FIG. 1 and FIG. 6, the positive projection pattern (not marked) of each microstructure 131 of the microstructures 131 of the embodiment on the surface of the first diffusion film 13 facing the viewer side VS has the long axis La, the short axis Sa, and the thickness H' (as shown in FIG. 1 and FIG. 7). The long axis La of each microstructure 131 is parallel to the extending direction E1" of each microstructure 131, wherein the extending direction E1" and the distribution direction D1 of the prism structures 110 and the light absorbing structure 120 are parallel to each other, the short axis Sa and the long axis La are perpendicular to each other, and the thickness H' of each microstructure 131 is the height of the protrusion from the surface of the substrate 130 toward the viewer side VS. In the embodiment, the length of the long axis La, the length of the short axis Sa, and the thickness H' of the microstructures 131 are designed, for example, in a randomly changing manner. In such a structural design, the microstructures 131 are arranged irregularly in order to solve the known defects of the projection screen image like the hotspots or the speckles. As shown in FIG. 7, each microstructure 131 of the embodiment is, for example, a semi-ellipsoidal three-dimensional structure in which the arc bending protrudes toward the viewer side VS.

Figure 8:
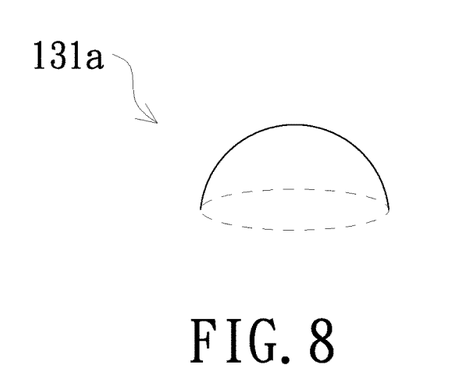
FIG. 8 is a schematic view showing the appearance structure of each microstructure shown in FIG. 1 according to another embodiment of the invention.
Figure 9:
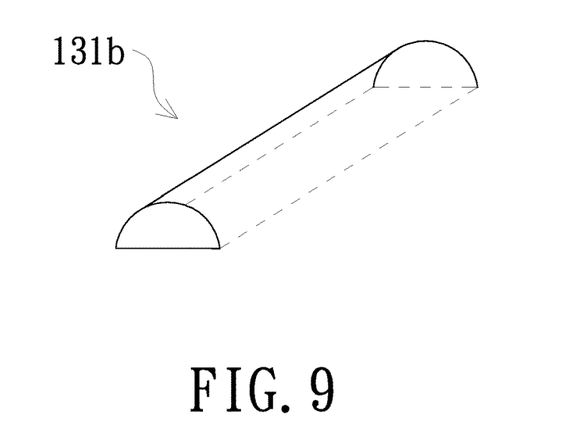
FIG. 9 is a schematic view showing the appearance structure of each microstructure shown in FIG. 1 according to another embodiment of the invention.

It is to be noted that the length of the long axis La, the length of the short axis Sa, and the thickness H' of the positive projection pattern of the microstructures 131 of the embodiment on the surface of the first diffusion film 13 facing the viewer side VS are arranged irregularly in a randomly changing manner is only one of the embodiments of the invention, to which the invention is not limited. In other embodiments, the length of the long axis La, the length of the short axis Sa, and the thickness H' of the microstructures 131 are, for example, the same as each other. In addition, each microstructure 131 of the embodiment is a semi-ellipsoidal three-dimensional structure in which the arc bending protrudes toward the viewer side VS is only one of the embodiments of the invention, to which the invention is not limited. In one embodiment, as shown in FIG. 8, each microstructure 131a of the embodiment is, for example, a hemispherical three-dimensional structure in which the arc bending protrudes toward the viewer side VS. In another embodiment, as shown in FIG. 9, each microstructure 131b of the embodiment is, for example, a semicylindrical three-dimensional structure in which the arc bending protrudes toward the viewer side VS.

It is worth mentioning that, in order to improve the contrast of the image, the anti-reflection coating or the anti-glare coating may be coated on the surface of the rear projection screen 1 of the embodiment. For example, the anti-reflection coating or the anti-glare coating (not shown in the figures) may be coated on the surface of the first diffusion film 13 facing the viewer side VS. The effect of the anti-reflection coating is to reduce the Fresnel loss of the external ambient light incident to the surface of the first diffusion film 13, that is, to improve the transmittance of the first diffusion film 13 for the external ambient light. In such circumstances, most of the external ambient light will penetrate the first diffusion film 13 and not be reflected by the first diffusion film 13 to the viewer side VS, thereby increasing the contrast of the image. The effect of the anti-glare coating is to eliminate the reflected light generated by the external ambient light incident to the first diffusion film 13 (Fresnel loss), thereby increasing the contrast of the image. In addition, the black material (such as black toner) may be added to any of the components of the rear projection screen 1 of the embodiment, such as the transparent substrate 11, the light absorbing film 12, or the first diffusion film 13, to improve the contrast of the image.

Figure 10:
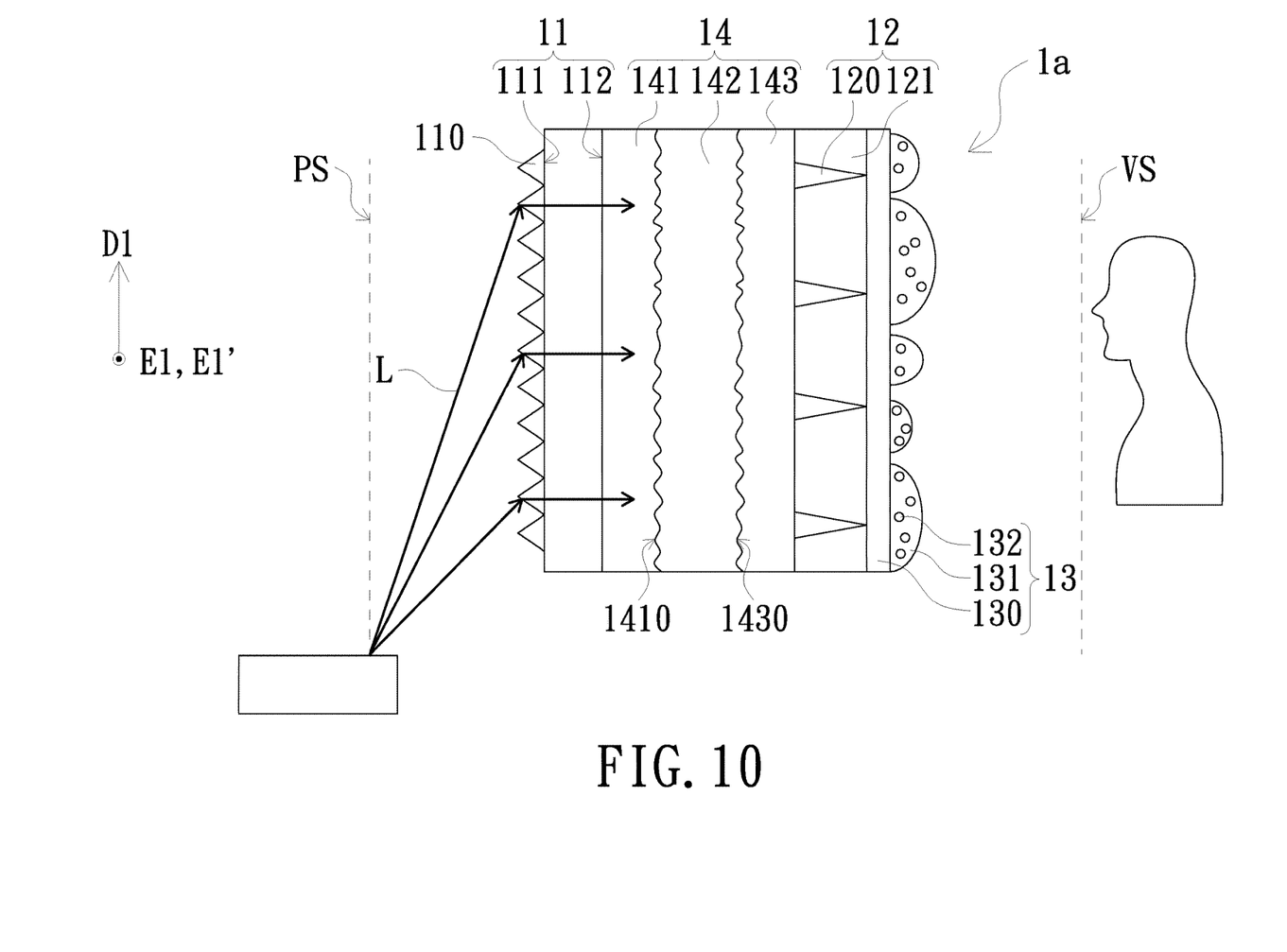
FIG. 10 is a schematic cross-sectional view of a rear projection screen according to another embodiment of the invention.

Referring to FIG. 10, which is a schematic cross-sectional view of a rear projection screen according to another embodiment of the invention. As shown in FIG. 10, the rear projection screen 1a of the embodiment is similar to the rear projection screen 1 shown in FIG. 1, and the difference is that the rear projection screen 1a of the embodiment further includes a second diffusion film 14. The second diffusion film 14 is located between the transparent substrate 11 and the light absorbing film 12, the second diffusion film 14 includes the first diffusion layer 141, the adhesive layer 142, and the second diffusion layer 143 in sequence from the projection side PS to the viewer side VS, and the first diffusion layer 141 is disposed on the second surface 112 of the transparent substrate 11. In the embodiment, the surface 1410 of the first diffusion layer 141 facing the adhesive layer 142 and the surface 1430 of the second diffusion layer 143 facing the adhesive layer 142 are, for example, roughened. For example, the surface 1410 of the first diffusion layer 141 and the surface 1430 of the second diffusion layer 143 are sandblasted, dry etched, or wet etched, to which the invention does not limit the roughening treatment. The material of the adhesive layer 142 of the embodiment is, for example, a low refractive index glue material, to which the invention is not limited. The adhesive layer 142 is disposed between the first diffusion layer 141 and the second diffusion layer 143, and the first diffusion layer 141 and the second diffusion layer 143 are adhered to each other by the adhesive layer 142. It is worth mentioning that the refractive index of the first diffusion layer 141 and the refractive index of the second diffusion layer 143 are, for example, greater than the refractive index of the adhesive layer 142.

Figure 11:
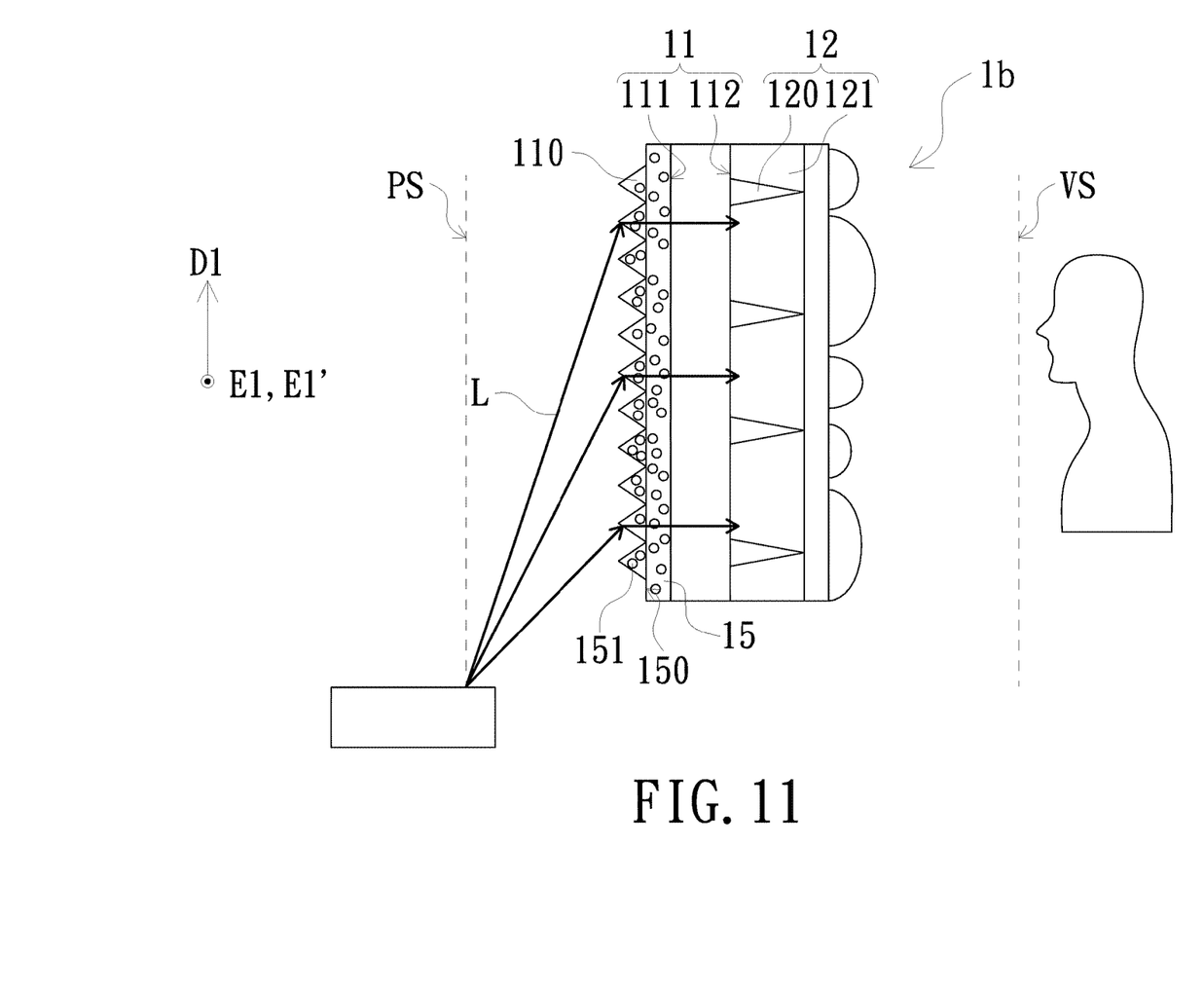
FIG. 11 is a schematic cross-sectional view of a rear projection screen according to another embodiment of the invention.

Referring to FIG. 11, which is a schematic cross-sectional view of a rear projection screen according to another embodiment of the invention. As shown in FIG. 11, the rear projection screen 1b of the embodiment is similar to the rear projection screen 1 shown in FIG. 1, and the difference is that the rear projection screen 1b of the embodiment further includes a prism film 15. The prism film 15 is disposed on the first surface 111 of the transparent substrate 11, and the prism structures 110 are disposed on the surface 150 of the prism film 15 facing the projection side PS. It is worth mentioning that, a plurality of diffusion particles 151 are distributed within the prism film 15 and the prism structures 110 of the embodiment, respectively. In addition, in the embodiment, the prism film 15 and the prism structures 110 are two independent components, to which the invention is not limited. In other embodiments, the prism film 15 is integrally formed with the prism structures 110.

Figure 12:
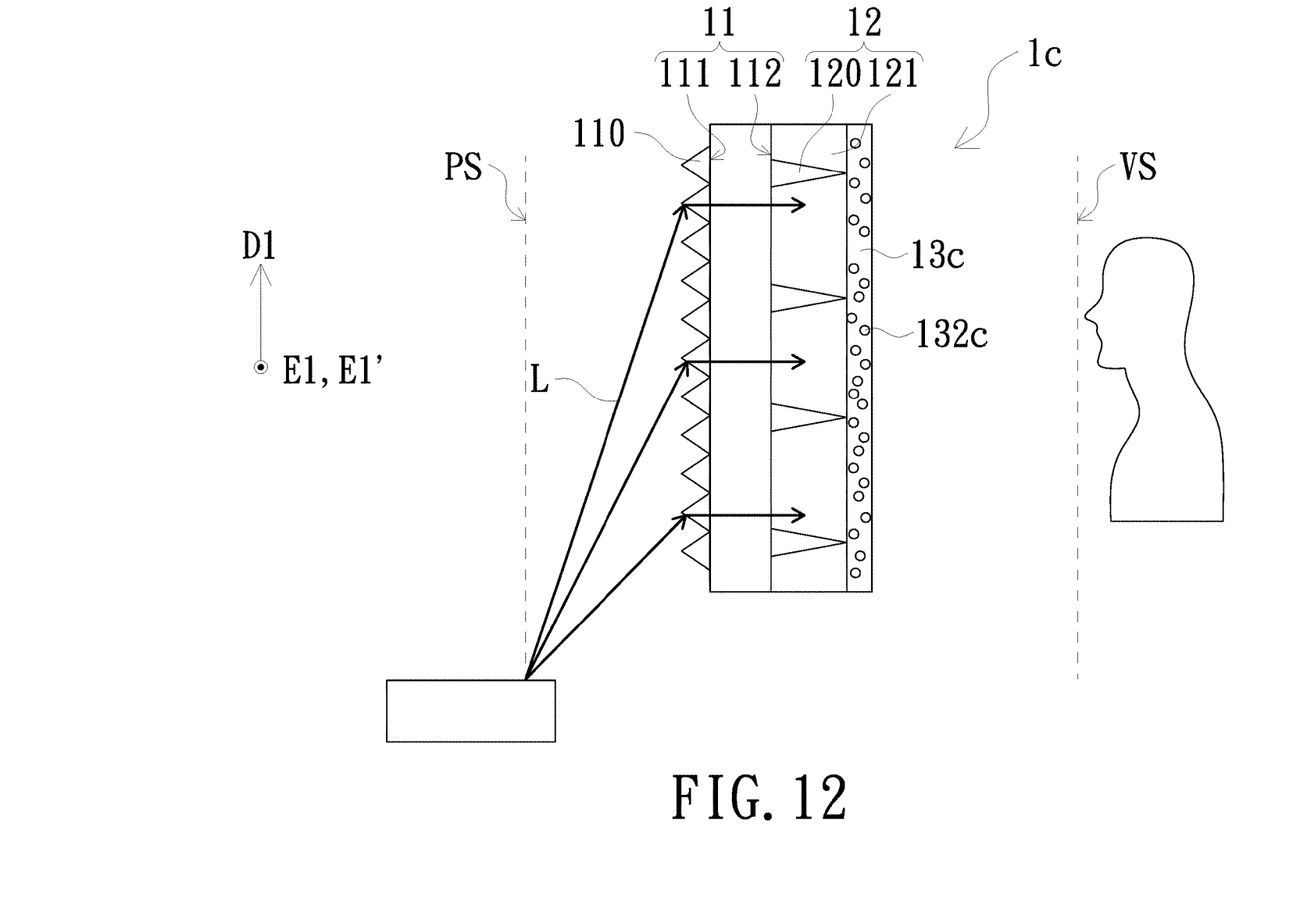
FIG. 12 is a schematic cross-sectional view of a rear projection screen according to another embodiment of the invention.

Referring to FIG. 12, which is a schematic cross-sectional view of a rear projection screen according to another embodiment of the invention. As shown in FIG. 12, the rear projection screen 1c of the embodiment is similar to the rear projection screen 1 shown in FIG. 1, and the difference is that the first diffusion film 13c of the embodiment is a sheet substrate, and the sheet substrate includes a plurality of diffusion particles 132c.

Figure 13:
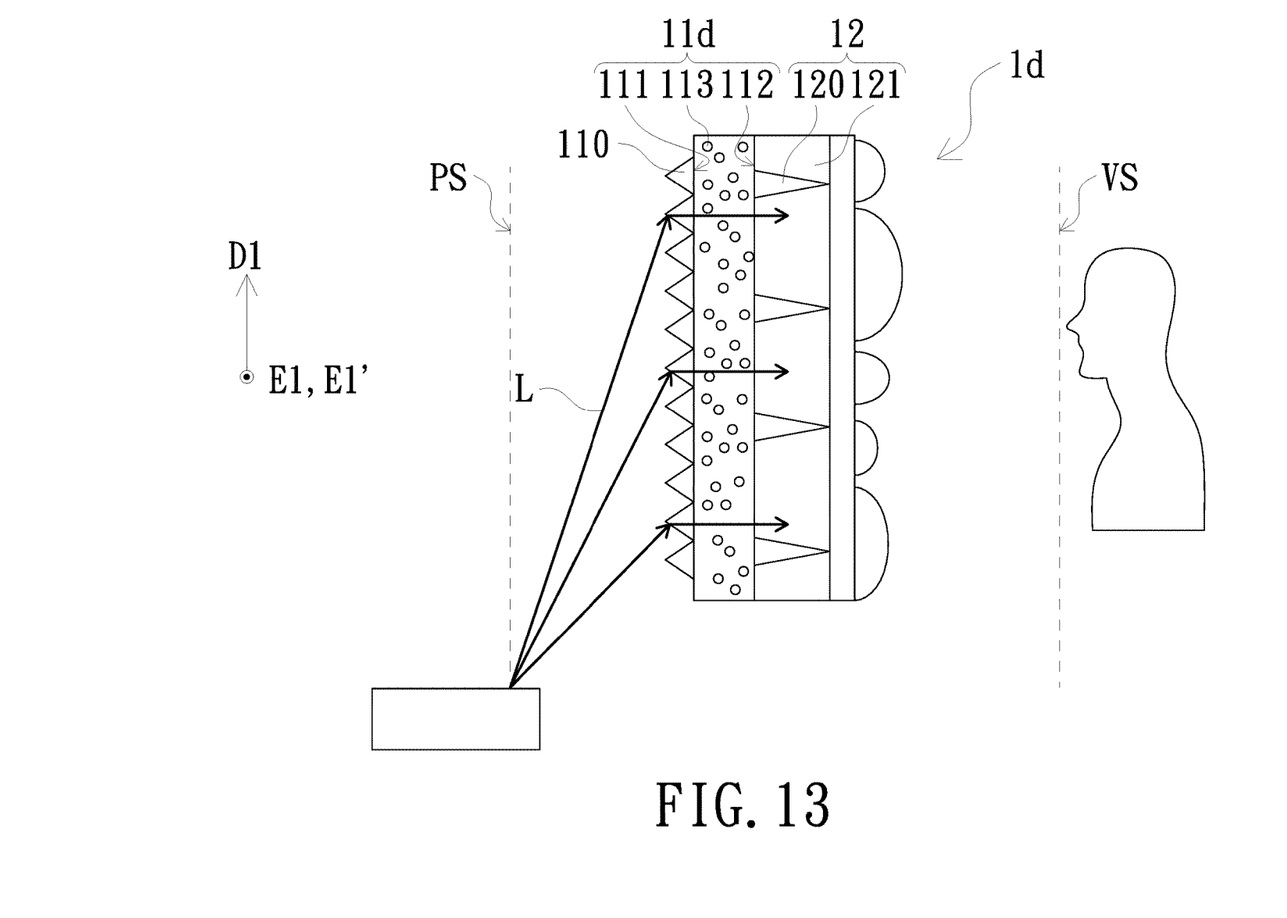
FIG. 13 is a schematic cross-sectional view of a rear projection screen according to another embodiment of the invention.

Referring to FIG. 13, FIG. 13 is a schematic cross-sectional view of a rear projection screen according to another embodiment of the invention. As shown in FIG. 13, the rear projection screen 1d of the embodiment is similar to the rear projection screen 1 shown in FIG. 1, and the difference is that the transparent substrate 11d of the embodiment further includes a plurality of diffusion particles 113.

Figure 14:
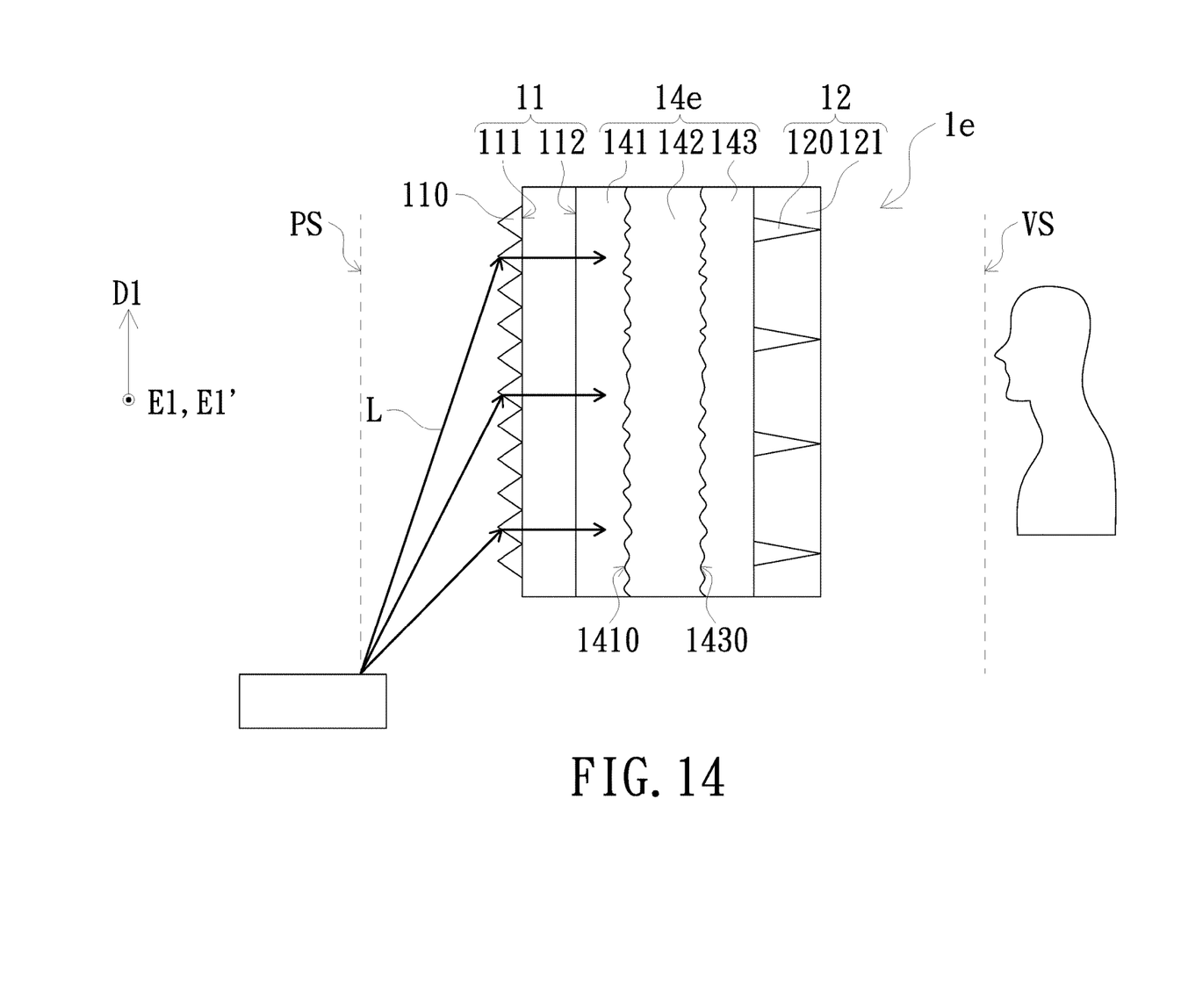
FIG. 14 is a schematic cross-sectional view of a rear projection screen according to another embodiment of the invention.

Referring to FIG. 14, which is a schematic cross-sectional view of a rear projection screen according to another embodiment of the invention. As shown in FIG. 14, the rear projection screen 1e of the embodiment is similar to the rear projection screen 1a shown in FIG. 10, and the difference is that the rear projection screen 1e of the embodiment is not disposed with the first diffusion film 13, and the diffusion film 14e is disposed between the light absorbing film 12 and the transparent substrate 11. The diffusion film 14e is similar to the second diffusion film 14 of the rear projection screen 1a, that is, the diffusion film 14e includes a first diffusion layer 141, an adhesive layer 142 and a second diffusion layer 143 in sequence from the projection side PS to the viewer side VS, wherein the arrangement position, the roughening treatment method and the material of the first diffusion layer 141, the adhesive layer 142 and the second diffusion layer 143 are similar to the corresponding film layers of the second diffusion film 14 in the rear projection screen 1a shown in FIG. 10, and will not repeat them again. When the projection beam L of the projection side PS enters the rear projection screen 1e, the projection beam L sequentially passes through the prism structures 110, the transparent substrate 11, the diffusion film 14e, and the light absorbing film 12. The projection beam L is guided to the forward direction, which is substantially perpendicular to the distribution direction D1 (horizontal direction) of the prism structure 110, through the total reflection of the prism structures 110. The projection beam L guided to the forward direction passes through the diffusion film 14e, and the projection beam L will be uniformly emitted from the rear projection screen 1 passing through the light-transmitting portions 121 of the light absorbing film 12.

In summary, the rear projection screens of the embodiments of the invention have the following advantages.

(1) In the embodiment of the invention, the prism structure having the refractive function and the light absorbing structure having the light absorbing function are independent optical components and arranged in different layers, and therefore, the rear projection screen of the embodiment of the invention can be applied to both hanging type projector and general downward projection architecture.

(2) The prism structure of the embodiment of the invention faces the projection side, and the guide of the optical path of the projection beam is completely by the refraction of the prism structure. Therefore, the rear projection screen of the embodiment of the invention can be applied to the super short focus projector and have high gain of luminance.

(3) The diffusion layer of the embodiment of the invention faces the viewer side, which contributes to improving the image quality and does not generate hotspots.

(4) By adjusting the distribution density of the light absorbing structures of the embodiments of the invention, it is helpful to improve the image quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first diffusion film, the second diffusion film, the first surface, the second surface, the first slope, the second slope, the first diffusion layer and the second diffusion layer are only used for distinguishing various elements and do not limit the number of the elements.

What is claimed is:

1. A rear projection screen, comprising a transparent substrate, a light absorbing film, and a first diffusion film in sequence from a projection side to a viewer side, wherein, the transparent substrate comprises a first surface and a second surface opposite to the first surface, the first surface faces the projection side, the second surface faces the viewer side, and the first surface is disposed with a plurality of prism structures protruding toward the projection side;

the transparent substrate is located between the light absorbing film and the prism structures, the light absorbing film comprises a plurality of light absorbing structures arranged at intervals from each other, wherein each of the light absorbing structures is a columnar structure tapered from the projection side toward the viewer side, and a distribution density of the prism structures is greater than a distribution density of the light absorbing structures;

the light absorbing film is located between the first diffusion film and the transparent substrate.

2. The rear projection screen according to claim 1, further comprising a second diffusion film located between the light absorbing film and the transparent substrate, wherein the second diffusion film comprises a first diffusion layer, an adhesive layer, and a second diffusion layer in sequence from the projection side to the viewer side, and the first diffusion layer is disposed on the second surface of the transparent substrate.

3. The rear projection screen according to claim 2, wherein a surface of the first diffusion layer and a surface of the second diffusion layer are roughened, the adhesive layer is disposed between the first diffusion layer and the second diffusion layer, and a refractive index of the first diffusion layer and a refractive index of the second diffusion layer are greater than a refractive index of the adhesive layer.

4. The rear projection screen according to claim 1, wherein the first diffusion film comprises a sheet substrate, and the sheet substrate comprises a plurality of diffusion particles.

5. The rear projection screen according to claim 1, wherein the first diffusion film comprises a substrate and a plurality of microstructures disposed on the substrate, and each of the microstructures comprises a plurality of diffusion particles.

6. The rear projection screen according to claim 5, wherein each of the microstructures has a long axis, a short axis, and a thickness, the long axis is parallel to an extending direction of the microstructure, and a length of the long axis, a length of the short axis and the thickness of the microstructures vary randomly.

7. The rear projection screen according to claim 5, wherein each of the microstructures is a hemispherical three-dimensional structure, a semi-ellipsoidal three-dimensional structure or a semi-cylindrical three-dimensional structure in which an arc bending protrudes toward the viewer side.

8. The rear projection screen according to claim 1, wherein the prism structures are arranged in a distribution direction, each of the prism structures is a columnar structure extending in an extending direction, and the distribution direction and the extending direction are not parallel to each other.

9. The rear projection screen according to claim 1, wherein the transparent substrate further comprises an axis, and the prism structures are in a concentric annular distribution from the axis along a radial direction.

10. The rear projection screen according to claim 1, wherein the transparent substrate further comprises a plurality of diffusion particles.

11. The rear projection screen according to claim 1, further comprising a prism film, wherein the prism film is disposed on the first surface of the transparent substrate, and the prism structures are disposed on a surface of the prism film facing the projection side.

12. The rear projection screen according to claim 11, wherein the prism film comprises a plurality of diffusion particles, and the diffusion particles are distributed within the prism structures.

13. The rear projection screen according to claim 1, wherein the light absorbing film further comprises a plurality of light-transmitting portions, the light-transmitting portions and the light absorbing structures are staggered with each other in a distribution direction respectively, each of the light absorbing structures is a columnar structure extending in an extending direction, and the distribution direction and the extending direction are not parallel to each other.

14. The rear projection screen according to claim 13, wherein the light absorbing structures of the light absorbing film have an arrangement period P in the distribution direction, each of the light absorbing structures has a thickness H, and the light absorbing structures satisfy: H/P<2.

15. The rear projection screen according to claim 13, wherein each of the light absorbing structures is the columnar structure tapered from the projection side toward the viewer side, a maximum width of each of the light absorbing structures in the distribution direction is greater than 10 microns, each of the light absorbing structures comprises a first slope and a second slope extending in the extending direction, the first slope connects the second slope, and an angle between the first slope and the second slope is less than 28 degrees.

16. The rear projection screen according to claim 1, wherein a surface of the first diffusion film facing the viewer side is coated with an anti-reflection coating or an anti-glare coating.

17. A rear projection screen, comprising a transparent substrate, a diffusion film, and a light absorbing film in sequence from a projection side to a viewer side, wherein,
the transparent substrate comprises a first surface and a second surface opposite to the first surface, the first surface faces the projection side, the second surface faces the viewer side, and the first surface is disposed with a plurality of prism structures protruding toward the projection side;
the transparent substrate is located between the light absorbing film and the prism structures, the light absorbing film comprises a plurality of light absorbing structures arranged at intervals from each other, wherein each of the light absorbing structures is a columnar structure tapered from the prosection side toward the viewer side, and a distribution density of the prism structures is greater than a distribution density of the light absorbing structures;
the diffusion film is located between the light absorbing film and the transparent substrate.

18. The rear projection screen according to claim 17, wherein the diffusion film comprises a first diffusion layer, an adhesive layer and a second diffusion layer in sequence from a projection side to a viewer side, and the first diffusion layer is disposed on the second surface of the transparent substrate.

19. The rear projection screen according to claim 18, wherein a surface of the first diffusion layer and a surface of the second diffusion layer are roughened, the adhesive layer is disposed between the first diffusion layer and the second diffusion layer, and a refractive index of the first diffusion layer and a refractive index of the second diffusion layer are greater than a refractive index of the adhesive layer.

20. The rear projection screen according to claim 17, wherein the prism structures are arranged in a distribution direction, each of the prism structures are a columnar structure extending in an extending direction, and the distribution direction and the extending direction are not parallel to each other.

21. The rear projection screen according to claim 17, wherein the transparent substrate further comprises an axis, and the prism structures are in a concentric annular distribution from the axis along a radial direction.

22. The rear projection screen according to claim 17, wherein the light absorbing film further comprises a plurality of light-transmitting portions, the light-transmitting portions and the light absorbing structures are staggered with each other in a distribution direction respectively, each of the light absorbing structures is a columnar structure extending in an extending direction, and the distribution direction and the extending direction are not parallel to each other.

23. The rear projection screen according to claim 22, wherein the light absorbing structures of the light absorbing film have an arrangement period P in the distribution direction, each of the light absorbing structure has a thickness H, and the light absorbing structures satisfy: H/P<2.

24. The rear projection screen according to claim 22, wherein each of the light absorbing structures is the columnar structure tapered from the projection side toward the viewer side, a maximum width of each of the light absorbing structures in the distribution direction is greater than 10 microns, each of the light absorbing structures comprises a first slope and a second slope extending in the extending direction, and an angle between the first slope and the second slope is less than 28 degrees.

* * * * *